(12) United States Patent
Jin et al.

(10) Patent No.: US 6,966,004 B1
(45) Date of Patent: *Nov. 15, 2005

(54) METHOD FOR PROVIDING SINGLE STEP LOG-ON ACCESS TO A DIFFERENTIATED COMPUTER NETWORK

(75) Inventors: Jane Jiaying Jin, San Jose, CA (US); Jie Chu, Los Altos, CA (US); Maria Alice Dos Santos, Redwood City, CA (US); Shuxian Lou, San Jose, CA (US); Xi Xu, Milpitas, CA (US); Shujin Zhang, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/642,534

(22) Filed: Aug. 14, 2003

Related U.S. Application Data

(63) Continuation of application No. 09/882,256, filed on Jun. 14, 2001, now Pat. No. 6,643,782, which is a continuation of application No. 09/128,990, filed on Aug. 4, 1998, now Pat. No. 6,311,275.

(51) Int. Cl.[7] .......................... H04L 9/32; G06F 15/16
(52) U.S. Cl. ..................................... 713/201; 709/228
(58) Field of Search ....................... 709/223–225, 709/227, 228, 238; 713/200–202

(56) References Cited

U.S. PATENT DOCUMENTS

| | | | |
|---|---|---|---|
| 5,003,595 A | 3/1991 | Collins et al. ................. 380/25 |
| 5,241,594 A | 8/1993 | Kung ............................. 380/4 |
| 5,241,599 A | 8/1993 | Bellovin et al. ............... 380/21 |
| 5,351,136 A | 9/1994 | Wu et al. ...................... 358/440 |
| 5,416,842 A | 5/1995 | Aziz ............................. 380/30 |
| 5,440,635 A | 8/1995 | Bellovin et al. ............... 380/25 |
| 5,555,244 A | 9/1996 | Gupta et al. ................. 370/60.1 |
| 5,570,361 A | 10/1996 | Norizuki et al. ........... 370/60.1 |
| 5,655,077 A | 8/1997 | Jones et al. ............ 395/187.01 |
| 5,668,857 A | 9/1997 | McHale ................... 379/93.07 |
| 5,671,354 A | 9/1997 | Ito et al. ................ 395/187.01 |
| 5,673,265 A | 9/1997 | Gupta et al. ................. 370/432 |

(Continued)

FOREIGN PATENT DOCUMENTS

WO      99/53408      10/1999

OTHER PUBLICATIONS

"Planning and Deploying a Single Sign-On Solution" 1997, Library.n0i.net, p. 1-45.*

(Continued)

*Primary Examiner*—Christopher Revak
(74) *Attorney, Agent, or Firm*—Thelen Reid & Priest LLP; David B. Ritchie

(57) ABSTRACT

A method for providing single step log-on access for a subscriber to a computer network. The computer network is differentiated into public and private areas. Secure access to the private areas is provided by a Service Selection Gateway (SSG) Server, introduced between a conventional Network Access Server (NAS) and an Authentication Authorization and Accounting (AAA) Server. The SSG Server intercepts and manipulates packets of data exchanged between the NAS and the AAA Server to obtain all the information it needs to automatically log the user on when the user logs on to the NAS. An authorized user is thus spared the task of having to re-enter username and password data or launch a separate application in order to gain secure access to private areas of the network.

15 Claims, 2 Drawing Sheets

U.S. PATENT DOCUMENTS

| | | | |
|---|---|---|---|
| 5,678,006 A | 10/1997 | Valizadeh et al. | 395/200.02 |
| 5,684,950 A | 11/1997 | Dare et al. | 395/187.01 |
| 5,699,521 A | 12/1997 | Iizuka et al. | 395/200.15 |
| 5,706,427 A * | 1/1998 | Tabuki | 713/201 |
| 5,740,176 A | 4/1998 | Gupta et al. | 370/440 |
| 5,815,665 A | 9/1998 | Teper et al. | 395/200.59 |
| 5,835,725 A | 11/1998 | Chiang et al. | 395/200.58 |
| 5,835,727 A | 11/1998 | Wong et al. | 395/200.68 |
| 5,841,970 A * | 11/1998 | Tabuki | 713/201 |
| 5,845,070 A | 12/1998 | Ikudome | 395/187.01 |
| 5,857,074 A | 1/1999 | Johnson | 395/200.47 |
| 5,898,780 A | 4/1999 | Liu et al. | 380/25 |
| 5,918,016 A | 6/1999 | Brewer et al. | 395/200.5 |
| 5,944,824 A | 8/1999 | He | 713/201 |
| 5,958,016 A | 9/1999 | Chang et al. | 709/229 |
| 5,974,453 A | 10/1999 | Andersen et al. | 709/220 |
| 5,987,232 A * | 11/1999 | Tabuki | 713/201 |
| 5,991,810 A | 11/1999 | Shapiro et al. | 709/229 |
| 6,011,910 A | 1/2000 | Chau et al. | 395/200.59 |
| 6,021,496 A | 2/2000 | Dutcher et al. | 713/202 |
| 6,047,376 A | 4/2000 | Hosoe | 713/201 |
| 6,092,196 A | 7/2000 | Reiche | 713/200 |
| 6,141,687 A | 10/2000 | Blair | 709/225 |

OTHER PUBLICATIONS

Vaudreuil, "Security Orientations, A Explanation of Single Sign On" Dec. 6, 1997, p. 1-5.*

Bellovin, Steven M., "Problem Areas for the IP Security Protocols", Jul. 22-25, 1996, Proceedings of the Sixth Usenix UNIX Security Symposium, San Jose, CA.

* cited by examiner

METHOD FOR PROVIDING SINGLE STEP LOG-ON ACCESS TO A DIFFERENTIATED COMPUTER NETWORK

This is a continuation of U.S. patent application Ser. No. 09/882,256, entitled "METHOD FOR PROVIDING SINGLE STEP LOG-ON ACCESS TO A DIFFERENTIATED COMPUTER NETWORK" by Jane Jin, et al., filed on Jun. 14, 2001, now issued as U.S. Pat. No. 6,643,782, which is a continuation of U.S. patent application Ser. No. 09/128,990, entitled "METHOD FOR PROVIDING SINGLE STEP LOG-ON ACCESS TO A DIFFERENTIATED COMPUTER NETWORK", by Jane Jin, et al., filed on August 4, 1998, now issued as U.S. Pat. No. 6,311,275.

BACKGROUND OF THE INVENTION

1. Field of the Invention

The present invention relates to a method for providing simplified access to subscribers of a differentiated computer network. Specifically, the present invention relates to a method for allowing single step log-on access to a network having more than one separate access area, such as a network divided into both public and private areas, where access to public areas is provided by a conventional Network Access Server, or NAS, and access to private areas is provided by a separate Service Selection Gateway, or SSG.

2. Background

Every day, millions of people around the world perform the modern ritual of the network "log-on." From the user standpoint, the process is simple: if all goes well, after a click of the mouse, and perhaps a few quick keystrokes, the short melodic over of computers exchanging bits begins, and the intrepid user soon finds himself speeding down the Information Superhighway. Mercifully, the user is usually spared from having to know anything about the technical details of the log-on procedure, which involves multiple servers working in concert to handle the thousands of subscribers who seek access to the network at any given time. The continued success of computer networking technology depends on keeping access easy. As networks have evolved, however, they have begun to differentiate into areas that provide specialized services to selected users. Because of this trend, security and user-authorization protocols are becoming more complicated, often in ways that conflict with the need for easy accessibility.

In order to gain access to a computer network, such as the World-Wide-Web, or the Internet, or a private Intranet network, a user must first dial-in or otherwise connect to a Network Access Server, or NAS. The NAS serves as a gate between the computer network and the user. As a threshold matter, the NAS must authenticate the identity of the subscriber in order to ascertain the nature and scope of the services that it will provide. Of course, if the network is differentiated into public areas that are accessible to all subscribers generally, and private areas that are accessible only to authorized subscribers, then the user's identity is particularly important.

The authentication procedure generally involves another server, herein referred to as an Authentication, Authorization, and Accounting Server, or an AAA Server. The NAS is a client of the AAA Server, which may serve several client NAS's simultaneously. The NAS and the AAA Server communicate with one another according to a standard Internet protocol, such as the Remote Authentication Dial-In User Service (RADIUS) protocol, developed by Livingston Enterprises of Pleasanton, Calif. The description of the authentication procedure that follows is based on the RADIUS protocol.

Typically, the user begins his or her session on the network by first launching a dial-in application on his or her PC that prompts the user to enter some form of user identification, like a user-name, and a private password. Such information may also be stored on and automatically provided by the PC. The dial-in application contacts an NAS, for instance, via modem and telephone line, and provides the NAS with the user-entered information. The password data is usually encrypted using methods well-known to those of ordinary skill in the art. The NAS then prepares and sends an "access-request" packet to the AAA Server. The access-request packet contains the data entered by the user, as well as additional data identifying the particular NAS client from which the packet was sent.

The AAA Server contains a large database of stored information on the accounts of each subscriber, including user-names, encrypted passwords and configuration information detailing the type of service that is to be provided to each user. When the AAA Server receives an access-request packet from an authorized NAS client, it consults its database of users to find the account entry for the user identified by the information contained in the access-request packet. The account entry will often specify certain requirements that must be met in order for the user to gain access to the network, including information on the clients and ports on the network which the user is allowed to access. An important requirement, of course, is that the password entered by the user match the password specified in the account entry on the AAA database. If the passwords match, and all the other requirements are met, then the AAA Server sends the NAS an "access-accept" packet in response. The access-accept packet contains configuration data that enable the NAS to provide the desired service to the user.

If any requirement is not met, then the AAA Server responds with an "access-reject" packet indicating that the user request in invalid. The access-reject packet may also contain text messages which may be delivered to the user by the NAS. Even if all the requirements are met, the AAA Server may still deny immediate access to the user and instead issue an "access-challenge" packet that prompts the user for new information before access is finally granted.

In order for the network to communicate with the user, the user must be assigned an IP address. User IP addresses are usually assigned dynamically, meaning that a user's IP address can change from session to session. The IP address can be assigned either by the AAA Server, or by the NAS. Once an IP address has been assigned to the user, the user is logged-on to the NAS and can begin his or her session on the network. After logging the user on, the NAS sends an "accounting-start" packet to the AAA Server, containing information regarding, for instance, the time at which the user's session begins, or other administrative and accounting data, that can be stored on the AAA Server's database.

A complication in this scheme arises when the network contains private areas whose access is regulated by a third server, herein referred to as a Service Selection Gateway, or SSG Server. The SSG Server is inserted between the NAS and the AAA Server, and its function is to create secure channels to private areas of the network for authorized users only. In order to access these private areas, an authorized user must somehow log-on to the SSG server as well.

Of course, it is possible to simply inflict upon the user the job of performing a second log-on to the SSG Server after the first log-on to the NAS. This approach is rather cumbersome and inelegant, however, and it requires the use of a separate and largely redundant software application on the user's PC, called a "dashboard." In order for an authorized user to access private areas of the network through the SSG Server, he or she must first log on to the network using the primary dial-in application, then launch the dashboard, and then log on a second time with the SSG Server.

This solution leaves much to be desired. The torment that comes from staring at pixellated cartoons of tiny telephones on a computer monitor, occasionally for minutes at a time, as a PC attempts to log-on to a heavily-trafficked network, is already an all-too familiar source of frustration to many subscribers of computer network services. Such delays can be caused, for instance, by the large number of access requests that must be handled by the AAA Server. The second log-on to the SSG requires a second authorization to access data from a private network and therefore simply adds unnecessarily to the traffic seen by the AAA Server. It also requires the user to re-enter his or her username and password.

Unfortunately, it is not enough to simply pass username and password information from the NAS to the SSG Server. Without the user IP address, the SSG Server has no way to send information from the private areas of the network to the user. While it might be possible to reconfigure the NAS to provide the IP address to the SSG Server directly, or demand that IP addresses are assigned by the AAA Server instead of the NAS, a more practical solution would view both the NAS and AAA Server as fixed and inviolate, and would seek instead to adapt the behavior of the SSG Server.

Accordingly, it is an object and advantage of the present invention to provide single step log-on access to a differentiated computer network having more than one separate access area, such as a network divided into both public and private areas, where access to public areas is provided by a conventional Network Access Server, or NAS, and access to private areas is provided by a separate Service Selection Gateway, or SSG.

Another object and advantage of the present invention is to provide single step log-on access to a differentiated computer network having more than one separate access area, such as a network divided into both public and private areas, where access to public areas is provided by a conventional NAS, and access to private areas is provided by an SSG, without altering the behavior of the NAS.

Another object and advantage of the present invention is to provide single step log-on access to a differentiated computer network having more than one separate access area, such as a network divided into both public and private areas, where access to public areas is provided by a conventional NAS, and access to private areas is provided by an SSG, without altering the behavior of the AAA Server.

Yet another object and advantage of the present invention is to provide single step log-on access to a differentiated computer network having more than one separate access area, such as a network divided into both public and private areas, without the need for a separate dashboard application.

BRIEF DESCRIPTION OF THE INVENTION

The present invention is a method for providing single step log-on access for a subscriber to a differentiated computer network having more than one separate access area. The method involves intercepting packets of data between the NAS and the AAA Server with an SSG Server, and manipulating these packets to obtain information needed by the SSG Server to log the user on automatically, without requiring the user to re-enter username and password data, or launch a separate application. Once the user is logged-on to the SSG Server, the SSG is able to provide the user with secure access to additional areas of the network. From the user's point of view, the log-on procedure with the SSG Server is identical to the log-on procedure without it.

BRIEF DESCRIPTION OF THE FIGURES

FIGS. 2A, 2B, and 2C are drawings illustrating the order in which packets are exchanged in a network of three servers during log-on.

DETAILED DESCRIPTION OF THE INVENTION

Those of ordinary skill in the art will realize that the following description of the present invention is illustrative only and is not intended to be in any way limiting. Other embodiments of the invention will readily suggest themselves to such skilled persons from an examination of the within disclosure.

Figure 1:
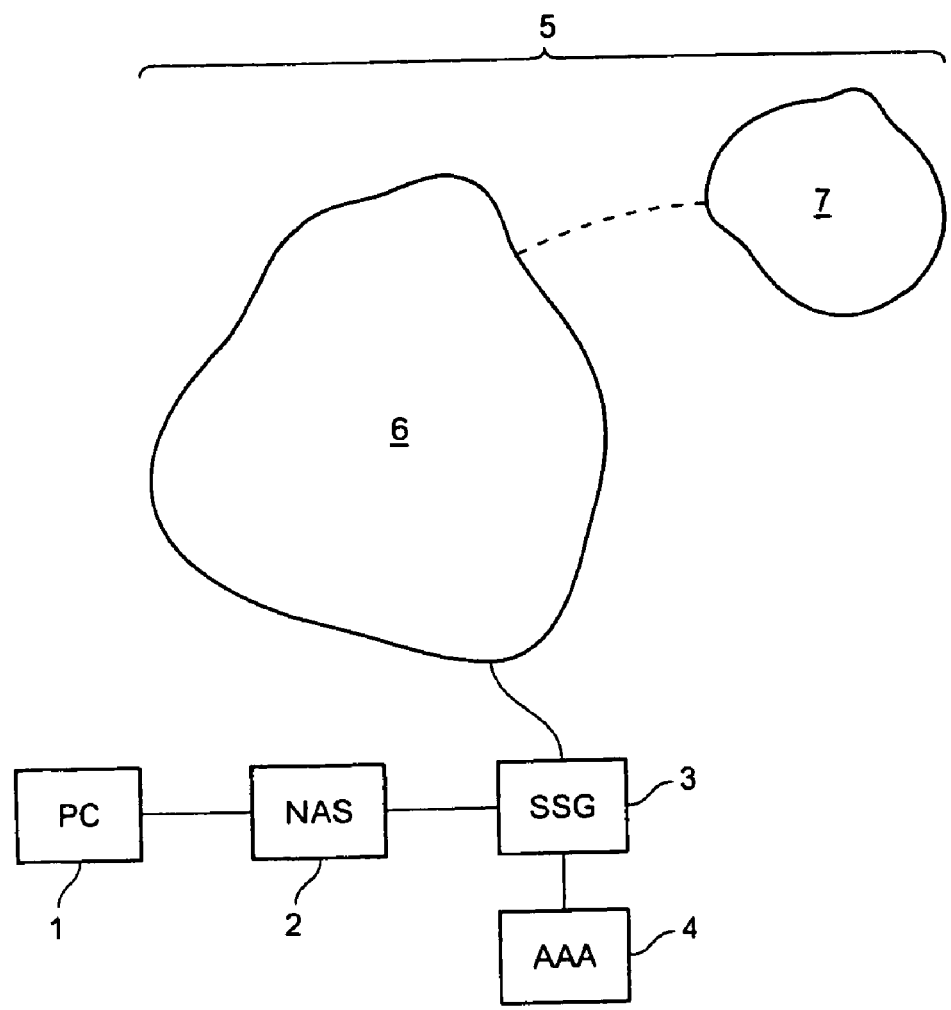
FIG. 1 is a schematic drawing of a network of three servers and a differentiated computer network.

In a presently-preferred embodiment of the invention, illustrated in FIG. 1, a subscriber PC 1 to a computer network 5 having both public and private areas 6, 7 is linked to a Network Access Server, or NAS 2. The NAS 2 is linked to an Authentication, Authorization, and Accounting Server, or AAA Server 4 through a Service Selection Gateway, or SSG 3. The NAS 2, SSG 3, and AAA 4 Servers communicate with one-another according to the Remote Access Dial-in User Service protocol, or RADIUS. The details of the RADIUS protocol are well-known to those of ordinary skill in the art. Moreover, as will be apparent to those of ordinary skill in the art, only a few general features of the RADIUS protocol are utilized by the present invention. The methods of present invention described herein are therefore applicable to any other authentication protocol equivalent in relevant part to the RADIUS protocol.

In essence, the need for a second log-on to the SSG Server 3 is obviated by allowing the SSG Server 3 to intercept and forward all packets of data exchanged between the NAS 2 and the AAA Server 4. To the NAS 2, the SSG Server 3 simply acts as a proxy AAA Server 4. The presence of the SSG Server 3 is unfelt by the NAS 2, which continues to behave exactly as if were connected directly to the AAA Server 4. By "eavesdropping" on the communications between the NAS 2 and the AAA Server 4, the SSG Server 3 is able to obtain all the information it needs to log the user on automatically, without requiring the user to re-enter data, or to launch a separate application. The methods of the present invention do not require any alteration in the behavior of the NAS 2, or the AAA Server 4.

Figure 2A:
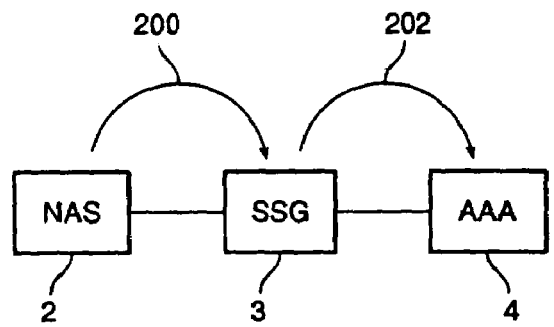

As described above, the user initiates a session on the network 5 by launching a dial-up application on his or her subscriber PC 1. The dial-up application prompts the user for user-name and password information, and contacts the NAS 2. The NAS 2 prepares an access-request packet containing the user-specified information, as well as information about the NAS client 2 itself. Instead of being delivered directly to the AAA Server 4, however, the access-request packet is first intercepted by the SSG Server 31 at step 200, as illustrated in FIG. 2A. Since the access-request packet contains username and password information, receipt of the access-request packet by the SSG Server 3 supplants the need for requiring the user to supply this information to the SSG Server 3 using a separate dashboard application. However, as described above, the SSG Server 3 still needs the user IP address to complete the log-on procedure. The user IP address, however, has not yet been assigned, and extra steps must be taken before the SSG Server 3 can officially is log the user on.

The SSG Server 3 forwards the access-request packet to the AAA Server 4 at step 202. The AAA Server 4 first authenticates the user by checking the data attributes in the access-request packet against its account database. The AAA Server 4 then responds to the access-request by issuing an access-reply packet back to the SSG Server 3 at step 204. If the user authentication check is successful, then the AAA Server 4 may assign an IP address to the user and include this IP address in the access-reply packet. The SSG server 3 then checks for an IP address in the access-reply packet. If the SSG Server 3 finds an IP address, then the SSG Server 3 can log the user on with the IP address provided by the AAA Server 4, and then forward the access-reply packet on to the NAS 2 immediately at step 206. Once the access-reply packet is received by the NAS 2, it may then log the user on as well, and the user session can begin.

Figure 2B:
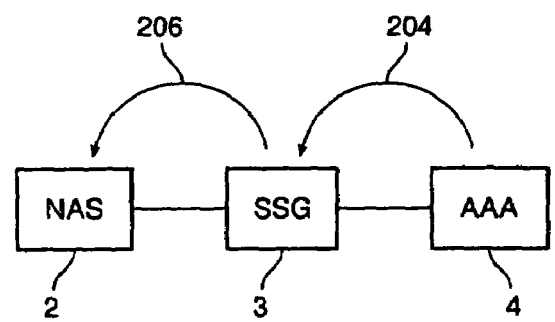

If the AAA Server 4 authorizes the user but does not assign an IP address, then the SSG Server 3 can log the user on with a dummy temporary IP address. It then assigns the user an identification number that it inserts into the access-reply packet before forwarding the access-reply packet to the NAS 2 at step 206, as illustrated in FIG. 2B. The identification number is written as a special attribute in the access-reply packet, called a "class attribute" in the RADIUS protocol. The class attribute is read and stored by the NAS 2 and echoed back unchanged in subsequent packets. The temporary IP address can be used as an identification number.

Figure 2C:
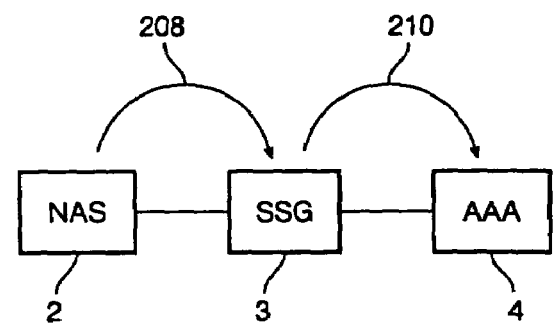

Upon receipt of the access-reply packet authorizing the user to access the network, the NAS 2 assigns a genuine IP address to the user and logs the user on. At step 208, the NAS 2 then prepares and sends an "accounting-start" packet to the AAA Server 4, containing information like the time at which the user began his or her session, as well as the genuine IP address assigned to the user by the NAS 2. The accounting-start packet serves an administrative function and would be prepared and sent by the NAS 2 even without the presence of an SSG Server 3, as illustrated in FIG. 2C. The accounting start packet is intercepted by the SSG Server 3 on its way to the AAA Server 4, and will contain not only an IP address, but also the class attribute identifying the user to whom the IP address belongs. With these two pieces of information, the SSG Server 3 can replace the dummy IP address with the genuine IP address for the user, and log the user on officially. Finally, the SSG Server 3 forwards the accounting start packet to the AAA Server 4 at step 210.

In short the user can now log on to both the NAS 2 and the SSG Server 3, without having to launch a second application, or perform a separate log-on to the SSG Server 3. From the vantage point of the user, the log-on procedure does not change in any way with the addition of the SSG Server 3. Because of the presence of the SSG Server 3, however, an authorized user is now able to gain secure access to, for example, private areas of the network, with the same ease that he or she is able to access the public areas.

ALTERNATIVE EMBODIMENTS

Although illustrative presently preferred embodiments and applications of this invention are shown and described herein, many variations and modifications are possible which remain within the concept, scope, and spirit of the invention, and these variations would become clear to those of skill in the art after perusal of this application. For example, the invention can be used with any type of connection between a user and an NAS and need not be limited to dial-up telephone connections. The invention, therefore, is not intended to be limited except in the spirit of the appended claims.

What is claimed is:

1. An apparatus for providing a single step log-on access for a subscriber of a computer network having a first area and a second area, said computer network including at least one Network Access Server (NAS) and at least one Authentication Authorization and Accounting (AAA) Server, said NAS providing access for the subscriber to said first area, said apparatus comprising:

a Service Selection Gateway (SSG) Server providing access for the subscriber to the second area, said SSG Server connected between the NAS and the AAA Server, said SSG Server configured to: (1) receive an access-request packet from the NAS when the subscriber connects the NAS, (2) forward said access-request packet to the AAA Server, (3) receive an access-reply packet from the AAA Server in response to said access-request packet, (4) forward said access-reply packet to the NAS, and (5) process information in said access-reply packet for enabling said SSG Server to automatically log the subscriber onto said SSG Server when the subscriber logs onto the NAS.

2. The apparatus of claim 1, wherein the access-request packet includes user-name and password information for the subscriber.

3. The apparatus of claim 2, wherein the SSG Server is further configured to utilize the user-name and password information for the subscriber to initiate log-on for the subscriber to the second area.

4. An apparatus for providing a subscriber with single step log-on access to computer network having a first area and a second area, the apparatus comprising:

a Service Selection Gateway (SSG) Server configured to: (1) intercept a log-on request packet from a Network Access Server (NAS), said log-on-request packet initiated by a user seeking to gain access to the first area, access to which is controlled by the NAS, and to the second area, access to which is controlled by the SSG Server, (2) send an authorization request packet derived from said log-on request packet to an Authentication, Authorization and Accounting (AAA) Server, (3) receive an authorization packet from the AAA Server and responsive to the authorization request packet, and (4) process said log-on request packet and said authorization packet to enable said SSG Server to automatically log the subscriber on to the SSG Server for access to the second area when the subscriber logs on to the NAS.

5. The apparatus of claim 4, wherein the log-on request is sent from the NAS.

6. The apparatus of claim 4, wherein said SSG Server is further configured to utilize information contained in the log-on request to initiate log-on for the subscriber to the second area.

7. An apparatus for providing a subscriber with single step log-on access to a computer network having a first area and a second area, the apparatus comprising:

a Service Selection Gateway (SSG) Server configured to: (1) intercept a log-on request initiated by the subscriber, (2) route the log-on request to an Authentication, Authorization and Accounting (AAA) Server to initiate log-on for the subscriber to the first area, (3) process an access-reply received from the AAA Server, (4) provide log-on access for the subscriber to the second area based on the access-reply, and (5) route the access-reply to a Network Access Server (NAS) to complete log-on for the subscriber to the first area.

8. The apparatus of claim 7, wherein the log-on request is sent from the NAS.

9. The apparatus of claim 7, wherein said SSG Server is further configured to utilize information contained in the log-on request to initiate log-on for the subscriber to the second area.

10. An apparatus for providing a subscriber with single step log-on to a computer network differentiated into a plurality of areas, the apparatus comprising:
a Service Selection Gateway (SSG) Server configured to:
(1) receive an access-reply from an Authentication, Authorization and Accounting (AAA) server, (2) check the access-reply to determine if it contains a network address assigned by the AAA server to the subscriber, (3) log the subscriber on to the SSG with the assigned network address if the access-reply contains authorization to do so from the AAA server and if it contains a network address assigned by the AAA server to the subscriber, and (4) forward the access-reply to a Network Access Server (NAS) so that the subscriber may log-on to the NAS with the assigned network address if the access-reply contains authorization to do so from the AAA server and if it contains a network address assigned by the AAA server to the subscriber.

11. The apparatus of claim 10, wherein said SSG Server is further configured to: if the access-reply does not contain an assigned IP address, (5) log the subscriber on to the SSG with a temporary IP address if the access-reply contains authorization to do so from the AAA server, (6) assign a user identification to the subscriber, (7) forward the access-reply and the user identification to the NAS so that the subscriber may log-on to the NAS with a NAS-assigned network address if the access-reply contains authorization to do so from the AAA server, (8) receive from the NAS an accounting-start request identifying the NAS-assigned network address and the user identification, (9) replace the temporary IP address with the NAS-assigned IP address, and (10) forward the accounting-start request to the AAA server.

12. The apparatus of claim 11, wherein the user identification is written into the access-reply packet as a Remote Authentication Dial-In User Service (RADIUS) attribute.

13. The apparatus of claim 12, wherein the RADIUS attribute is a RADIUS class attribute.

14. The apparatus of claim 10, wherein said SSG Server is further configured to: (5) receive an access-request from the NAS, and (6) forward the access-request to the AAA server.

15. The apparatus of claim 10, wherein the user identification is the temporary network address.

* * * * *